Aug. 21, 1951   F. E. MARTIN ET AL   2,564,810
BATTERY TERMINAL PROTECTOR
Filed Oct. 21, 1947
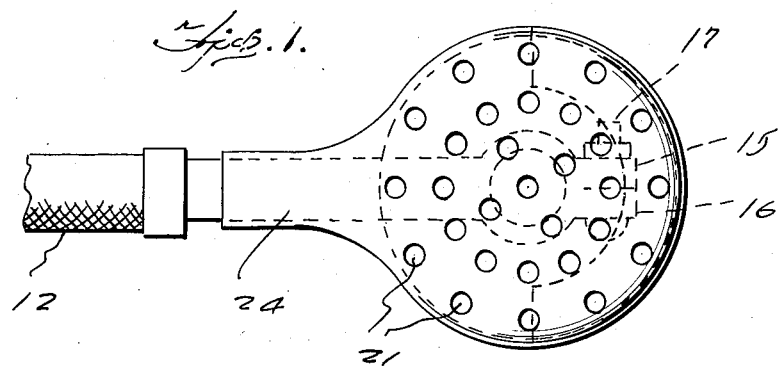
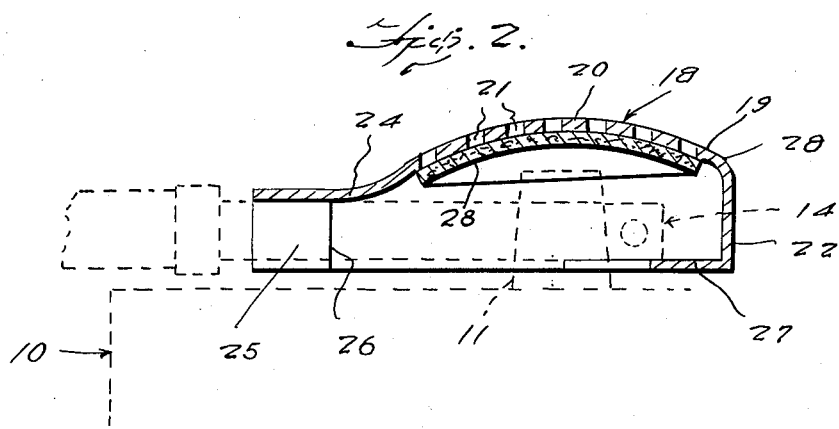
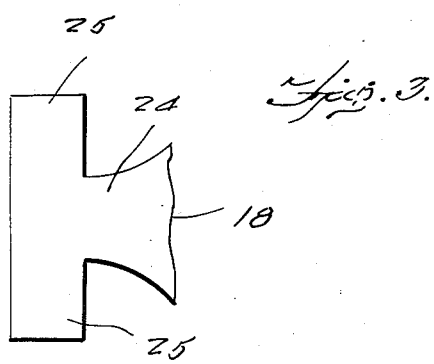
Inventors
Francis E. Martin
Joseph A. Daugherty
By
McMorrow, Berman & Davidson
Attorneys Patented Aug. 21, 1951

2,564,810

UNITED STATES PATENT OFFICE 2,564,810

BATTERY TERMINAL PROTECTOR

Francis E. Martin and Joseph A. Daugherty, East Rainelle, W. Va.; said Martin assignor to said Daugherty Application October 21, 1947, Serial No. 781,124

3 Claims. (Cl. 173—259)

This invention relates to batteries and more particularly to a protector or cover for the connection of the battery cable to the terminals.

It is an object of this invention to provide a cover for the battery terminal and clamp to prevent the corrosive effects of the acids and gases generated within the battery. In the common usage of battery clamps on the terminals, the fumes and acids from the battery will eventually cause the corrosion of the clamp onto the terminal causing them to be locked together and presenting great difficulty in the removal of the clamp when it is necessary to charge the battery or otherwise remove it from the automobile.

With the use of a cover or protector constructed according to an embodiment of this invention, the corrosion between the clamp and terminal is completely eliminated so that the battery may be readily removed when desired.

Still another object of this invention is to provide a battery terminal protector of the kind to be more particularly described hereinafter so constructed and arranged that it may be readily attached to the cable connected to the terminals whereby the device may be readily attached to the terminals and batteries currently in use.

With the above and other objects in view, our invention consists in the arrangement, combination and details of construction disclosed in the drawings and specification, and then more particularly pointed out in the appended claims.

In the drawings,

Figure 1 is a top plan view of a battery terminal protector constructed according to an embodiment of our invention, Figure 2 is a longitudinal vertical section through the protector shown in Figure 1, and Figure 3 is a top plan view partly broken away showing the attaching ears in their extended position.

Referring to the drawings, the numeral 10 designates generally the case of a battery having a terminal post 11 thereon. While all of the batteries are formed with the positive and negative terminal posts, in the drawings only one post 11 is shown.

The battery cable 12 is attached to the post 11 in a conventional manner by a clamp 14 fixed on the end of the cable. The clamp 14 may be of any conventional style having a pair of clamping arms 15 and 16 connected together by a clamping bolt or pin 17.

In the use of a terminal clamp of this type the acid and fumes from the battery will frequently cause corrosion of the clamp usually made of steel whereby the clamp will become frozen onto the terminal post 11 which is made of lead.

We have provided a cap or cover 18 which is adapted to encompass or enclose therein the terminal post 11 and clamp 14. The cover 18 contains therein a suitable chemical for counteracting the deleterious corrosive effect of the fumes and acid.

The cover 18 is formed of a concavo-convex body 19 having an upper wall 20 provided with a plurality of perforations 21 therethrough. A depending cylindrical outer wall 22 is provided about the lower end of the concavo-convex body 19.

One of the ends of the cover 18 extends beyond the body 18 of the cap to form a radial extension 24 thereof. The extension 24 is provided with a pair of oppositely extending attaching ears 25 which may be formed by cutting slots 26 in the depending side walls 22 adjacent the end of the projection 24.

The upper ends of the slots 26 may terminate at the juncture of the outer wall 22 and the portion of the upper wall 20 on the extension 24.

The ears 25 are adapted to be clamped about the cable 12 behind the clamp 14 for attaching the cover 18 thereto. The ears 25, preferably made of the same material as the remainder of the cap 18, have a certain degree of resilience enabling them to be spread for removal of the cover from the cable when desired.

A semi-circular horizontal flange 27 is fixed to or formed on the lower end of the side walls 22 on the cap 18 at the end thereof opposite from the extension 24. The flange 27 is adapted to underlie the clamping members 15 and 16 of the clamp 14 for positioning the cap or protector 18 about the clamp 14 and post 11. In this manner the side walls 22 of the cap 18 are positioned completely about the post 11 and clamp 14.

Interiorly of the cap 18 I have secured a pad 28 to the wall 20 which may be made of felt or other suitable fabric or porous material. The pad 28 is impregnated with bicarbonate of soda or other suitable chemical for counteracting the corrosive effects of the fumes or acid from the battery 10.

The pad 28 is secured to the lower surface of the upper wall 20 of the cap 18 and is adapted to close the openings or apertures 21 therethrough. Since the pad 28 is porous, the gases or liquids are not restrained from passing through the perforations 21 but will be forced to penetrate through the pad 28 as the gases or liquid flow through the cap.

While bicarbonate of soda has been found to be a suitable chemical for counteracting or preventing the corrosive effect of the fumes and gases from the battery which are generally sulphuric acid and the resulting gases, other suitable chemicals may be used.

We do not mean to confine ourselves to the exact details of construction herein disclosed but claim all variations falling within the purview of the appended claims.

Having thus described our invention, what we claim is:

1. An anti-corrosion device for association with a storage battery post and a battery cable having a clamp surrounding the post, said device comprising an inverted pan-shaped circular body larger in diameter than the post and the surrounding clamp and adapted to be substantially concentrically superimposed thereon, said body comprising a peripheral wall to depend in protective relation to the sides of said clamp and post, said body having a radial projection arranged to protectively overlie the battery cable adjacent to the clamp, said projection having ears adapted to be bent around the cable, a portion of said peripheral flange opposite said radial projection having a radially inwardly projecting flange arranged to engage beneath an adjacent part of the cable clamp so as to cooperate with said ears in holding the device in place, the top wall of said body being formed with holes, and a porous pad secured to the underside of said top wall and occluding said holes and containing anti-corrosion material.

2. A protective cover for a battery terminal post and associated cable and cable clamp comprising a concavo-convex circular plate larger in diameter than the post and associated cable clamp and adapted to be concentrically superimposed thereon, said plate having a radially projecting portion to overlie the battery cable adjacent to said clamp, a depending wall extending around the periphery of said plate and along the opposite sides of said radially projecting portion in protective relation to the sides of the battery post, cable clamp, and cable, the portions of said depending wall extending along said radially projecting portion being formed with vertical slots at points adjacent to and spaced from the outer end of said radially projecting portion and defining ears adapted to be bent relative to the remainder of said wall and clamped around the battery cable so as to secure the cover in place, said plate being formed with holes, and a porous pad secured to the underside of said plate and occluding the holes and adapted to contain anti-corrosion material.

3. A protective cover for a battery terminal post and associated cable and cable clamp comprising a concavo-convex circular plate larger in diameter than the post and associated cable clamp and adapted to be concentrically superimposed thereon, said plate having a radially projecting portion to overlie the battery cable adjacent to said clamp, a depending wall extending around the periphery of said plate and along the opposite sides of said radially projecting portion in protective relation to the sides of the battery post, cable clamp, and cable, the portions of said depending wall extending along said radially projecting portion being formed with vertical slots at points adjacent to and spaced from the outer end of said radially projecting portion and defining ears adapted to be bent relative to the remainder of said wall and clamped around the battery cable so as to secure the cover in place, said depending wall having a horizontal flange on its lower edge limited to the side of said cover opposite said radially projecting portion and arranged to be engaged under the clamp at the side thereof opposite the cable to augment the securing action of the ears clamped around the cable, said plate being formed with holes, and a porous pad secured to the underside of said plate and occluding the holes and adapted to contain anti-corrosion material.

FRANCIS E. MARTIN.
JOSEPH A. DAUGHERTY.

REFERENCES CITED

The following references are of record in the file of this patent:

UNITED STATES PATENTS

| Number | Name | Date |
|---|---|---|
| 1,154,201 | Ochs | Sept. 21, 1915 |
| 1,610,703 | Olson | Dec. 14, 1926 |
| 1,686,817 | Johnson | Oct. 9, 1928 |
| 1,712,823 | Hebbeler | May 14, 1929 |
| 1,796,156 | McMorris | Mar. 10, 1931 |
| 2,065,558 | Berryman | Dec. 29, 1936 |

FOREIGN PATENTS

| Number | Country | Date |
|---|---|---|
| 497,729 | Great Britain | Mar. 19, 1937 |
| 552,763 | Great Britain | Apr. 22, 1943 |